US011017206B2

(12) United States Patent
Saruwatari et al.

(10) Patent No.: US 11,017,206 B2
(45) Date of Patent: May 25, 2021

(54) IMAGE PROCESSING METHOD AND RECORDING MEDIUM FOR EXTRACTING REGION OF IMAGING TARGET FROM IMAGE

(71) Applicant: SCREEN HOLDINGS CO., LTD., Kyoto (JP)

(72) Inventors: Takeshi Saruwatari, Kyoto (JP); Tomoyasu Furuta, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 77 days.

(21) Appl. No.: 16/450,094

(22) Filed: Jun. 24, 2019

(65) Prior Publication Data
US 2020/0019748 A1 Jan. 16, 2020

(30) Foreign Application Priority Data
Jul. 10, 2018 (JP) .............................. JP2018-130452

(51) Int. Cl.
*G06T 5/20* (2006.01)
*G06K 9/00* (2006.01)
(Continued)

(52) U.S. Cl.
CPC .............. *G06K 9/0014* (2013.01); *G06T 5/10* (2013.01); *G06T 5/20* (2013.01); *G06T 7/0012* (2013.01);
(Continued)

(58) Field of Classification Search
CPC ..... G06K 9/00127–00147; G06T 2207/30024; G06T 2207/10056;
(Continued)

(56) References Cited

U.S. PATENT DOCUMENTS

| 5,528,703 A | * | 6/1996 | Lee ..................... G01N 15/1475 382/100 |
| 2011/0274337 A1 | * | 11/2011 | Hunter ............... G06K 9/00127 382/133 |
| 2016/0348057 A1 | * | 12/2016 | Nomura .................... G06T 7/62 |

FOREIGN PATENT DOCUMENTS

JP 2016-116461 A 6/2016

OTHER PUBLICATIONS

Fatimah Mohammad et al., "Photoreceptor cell counting in adaptive optics retinal images using content-adaptive filtering", Proc. SPIE 7626, Medical Imaging 2010: Biomedical Applications in Molecular, Structural, and Functional Imaging, (Mar. 9, 2010); pp. cover and pp. 1-8. (Year: 2010).*

* cited by examiner

*Primary Examiner* — Brian Werner
(74) *Attorney, Agent, or Firm* — McDermott Will & Emery LLP

(57) ABSTRACT

An image processing method includes acquiring an original image including cells as an imaging target, performing band-pass filtering on the original image with respect to a spatial frequency component within a band determined in accordance with a width of an outline of the imaging target and attenuating relatively other spatial frequency component outside the band, segmenting an image after the filtering into a first region having density higher than a threshold value and a second region, connecting the first regions sandwiching the second region by changing a portion of the sandwiched second region to the first region in an image after the segmenting, converting a closed region which is the second region in an image after the connection surrounded by the first region into the first region, and dividing the first region having a neck into regions at a position of the neck in an image after the converting.

8 Claims, 9 Drawing Sheets

(51) Int. Cl.
   *G06T 7/00* (2017.01)
   *G06T 5/10* (2006.01)
   *G06T 7/11* (2017.01)
(52) U.S. Cl.
   CPC ...... *G06T 7/11* (2017.01); *G06T 2207/30024* (2013.01)
(58) Field of Classification Search
   CPC ............... G06T 2207/10141–10152; G06T 2207/10064; G06T 7/0012–0016; G06T 7/11
   See application file for complete search history.

IMAGE PROCESSING METHOD AND RECORDING MEDIUM FOR EXTRACTING REGION OF IMAGING TARGET FROM IMAGE

CROSS REFERENCE TO RELATED APPLICATION

The disclosure of Japanese Patent Application No. 2018-130452 filed on Jul. 10, 2018 including specification, drawings and claims is incorporated herein by reference in its entirety.

BACKGROUND OF THE INVENTION

1. Field of the Invention

The present invention relates to an image processing technique for extracting a region of an imaging target from an image obtained by imaging a cell or a cell-based structure formed of a plurality of cells that aggregate, as the imaging target.

2. Description of the Related Art

There are some cases where imaging is performed on a sample such as cells cultured in a container, for the purpose of quantitatively measuring the number of cells, the size of each cell, or the like. For this purpose, the imaging is sometimes performed by introducing a fluorescent reagent or the like to the cells, and such an operation damages the cells. On the other hand, for the purpose of continuous culture, observation, or the like, it is sometimes required to perform the imaging and the measurement by a noninvasive method.

The technique to satisfy such a requirement is disclosed in, for example, JP2016-116461A. In this technique, two-level threshold values are set for the density of an image of unstained cell, and the image is segmented into a region of a living cell, a region of a dead cell, and the other region by the comparison with the threshold values.

The above-described background art is premised on that the cells are distributed in a background having uniform density and the cells have significant differences in the density from the background. However, an actual sample does not always have uniform density and in most cases, the cell does not have a clear difference in the density from the background. Further, the image can include structures other than the cells or the three-dimensional cell-based structure to be measured. Due to these reasons, there arises a problem that it is difficult to accurately extract the cells or the three-dimensional cell-based structure to be measured by using the method in which the threshold values are simply set for the density value and the image is distinguished on the basis thereof.

SUMMARY OF THE INVENTION

The present invention is intended to solve the above problem, and it is an object of the present invention to provide a technique for accurately extracting a region of a cell or a cell-based structure from an image.

In order to achieve the above object, the present invention is intended for an image processing method. According to one aspect of the present invention, the image processing method includes acquiring an original image including a cell or a three-dimensional cell-based structure formed of a plurality of cells that aggregate, as an imaging target, performing band-pass filtering on the original image, with respect to a spatial frequency component of a band determined in accordance with the width of an outline of the imaging target, for relatively attenuating the other spatial frequency component outside the band, segmenting an image after the filtering into a first region which is a region having density higher than a predetermined threshold value and a second region which is a region other than the first region, connecting a plurality of the first regions that sandwich the second region by changing a portion of the second region which is sandwiched by the first regions to the first region in an image after the segmenting, converting a closed region which is the second region in an image after the connection surrounded by the first region into the first region; and dividing the first region having a neck into a plurality of regions at a position of the neck in an image after the converting.

The present invention configured as above uses the findings that a figure of the cell or the three-dimensional cell-based structure (hereinafter, referred to typically as a "cell", but the same applies to a "three-dimensional cell-based structure") in an image has generally an outline with an approximately constant width. Specifically, there is a high probability that the region surrounded by the outline having a predetermined width and a predetermined density in the image is a region corresponding to the cell. Therefore, such a region has to be extracted from the image. However, the density of a background around the cell has irregularity. Further, the outline of the cell itself has variation in the width or an unclear portion. Furthermore, the image can include structures other than the cells which are the imaging targets, waste products (debris), or the like. Due to these causes, there are some cases where binarization (image thresholding) using a simple threshold value or general outline extraction does not effectively work.

Then, in the present invention, a region of a cell is extracted from an image as follows. Specifically, first, the band-pass filtering is performed on an original image including cells, for selectively leaving a spatial frequency component corresponding to the width of an outline of a cell. With this operation, in the original image, a structure having a size near the outline width is emphasized while a component corresponding to a relatively small structure other than the cells or irregularity or the like of a background having a gentle change in the density is reduced. If a rough size of the cell in the image can be known, such extraction in accordance with the size of the outline can be performed.

In the image, the outline portion of the cell has density higher than that of surroundings. Therefore, when the region having relatively high density (the first region in the present invention) is separated from a region having low density in the image after the filtering, there is a high probability that the high density region includes the outline of the cell. For the above described reason, however, there are some cases where the outline to be extracted is partially lacked. In order to compensate the lack, the first regions which are opposed, sandwiching the second region, are connected to each other. An internal region of a closed region surrounded by the outline extracted, whose lack portion is compensated thus, can be thought as an inside of the cell. Therefore, all the region is regarded as the first region.

Further, there are some cases where a plurality of cells partially overlap each other in the image. If these cells are regarded as one unit, this can be an error factor in the quantitative measurement. Then, the first region having a neck is divided into a plurality of regions at the neck position. With this operation, a plurality of cells which are originally different cells but overlap each other in the image can be separated from each other.

With the above operations, in the present invention, it is possible to suppress an effect of the irregularity in the background density, the unclarity of the outline of the cell itself, a substance other than the cell included in the image, or the like and to accurately extract the region of the cell from the image.

The image processing method in accordance with the present invention can use a computer as an execution subject. In this sense, the present invention can be achieved as a computer program which causes a computer to perform the above process. Further, the present invention can be also achieved as a non-transitory recording medium which non-transitorily records thereon the computer program.

As described above, according to the image processing method of the present invention, the image processing including the band-pass filtering in accordance with the outline width of the cell or the like (cell or cell structure), the processing for compensating the lack of the outline, the processing for separating the cells which overlap each other in the image, and the like is performed. It is thereby possible to suppress the effect of the irregularity in the background density, the unclarity of the outline of the cell itself, a substance other than the cell included in the image, or the like and to accurately extract the region of the cell from the image.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Hereinafter, one embodiment of an image processing method in accordance with the present invention will be described. The image processing of this embodiment is processing for dividing a region of a cell or a three-dimensional cell-based structure formed of a plurality of cells that aggregate (hereinafter, referred to typically as a "cell", but unless otherwise noted, this is a concept including a "cell-based structure") and the other region from an image obtained by imaging the cell or the three-dimensional cell-based structure which is cultured in a culture medium and outputting a result image. This image processing is performed on an unprocessed original image which is captured by an imaging apparatus having an imaging function for capturing an image of a sample including cells. The imaging apparatus may perform this image processing as one of post-processings on image data obtained after the imaging. Further, a computer device which receives the image data from the imaging apparatus or an appropriate storage device may perform this image processing.

Herein, an aspect of the present invention in which a general-purpose computer device performs the image processing of the present embodiment on original image data generated by imaging which is already performed will be exemplarily described. The configuration of the imaging apparatus is not particularly limited only if the imaging apparatus has a function of imaging a sample including cultured cells together with a culture medium and outputting the captured image as digital image data. Further, it is preferable that the image should be a bright field image. Furthermore, the computer device having a general hardware configuration, which is commercialized as, for example, a personal computer, can be used. Hereinafter, detailed description on the hardware will be omitted.

Figure 1:
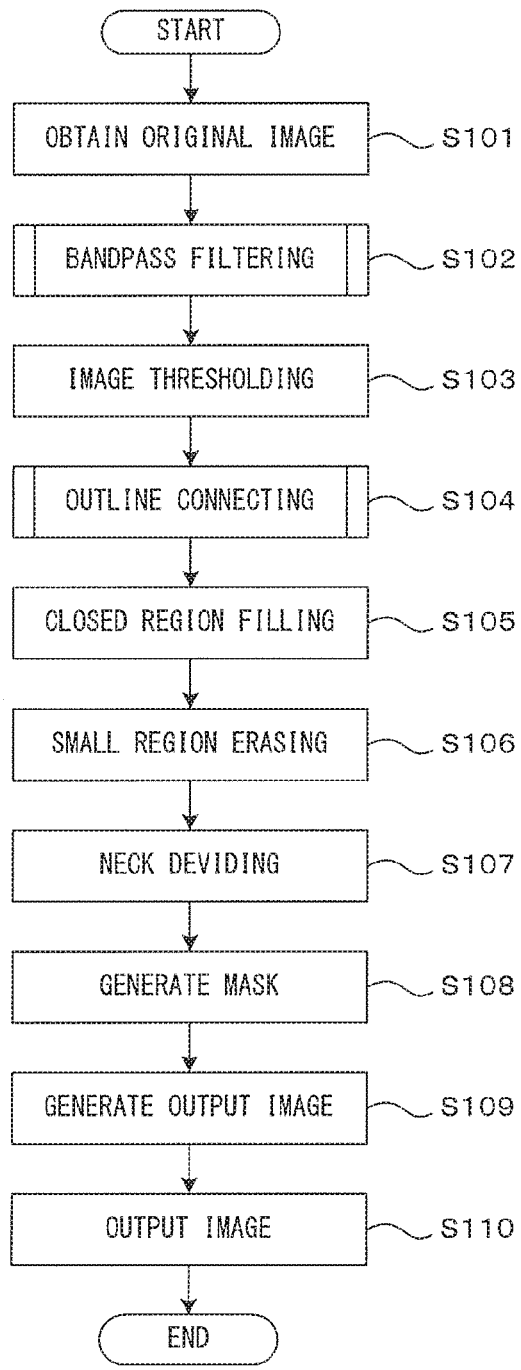
FIG. 1 is a flowchart showing the image processing of the present embodiment.

FIG. 1 is a flowchart showing the image processing of the present embodiment. First, with reference to FIG. 1, an outline of the image processing of the present embodiment will be described, and then specific operations thereof will be described in detail. A computer device first acquires an original image (Step S101). The original image is an image obtained by bright field imaging of a sample including cells cultured in a culture medium, with an appropriate imaging apparatus and an appropriate imaging condition. It is assumed that the original image includes at least one whole cell. In other words, an imaging magnification and a field of view are set thus. Therefore, besides the cell to be detected, the original image can include a very small cell, a debris, a background, and the like other than the cell to be detected.

The image processing of the present invention is especially suitable for a cell whose rough outer shape appears as a relatively smooth closed curve, for example, a cell whose rough outer shape is singly a substantially spherical shape or a spheroidal shape in a culture solution, or a three-dimensional cell-based structure formed of a plurality of cells that aggregate in a substantially spherical shape (such a structure is particularly referred to also as a "sphere", a "spheroid", or the like). In such a cell, its outline appears darker with low luminance (the image density is high) than a surrounding region in the image. Detection of such an outline with high accuracy leads to accurate extraction of the region of the cell.

Though described in detail later, in the present embodiment, an outline portion of the cell is extracted by performing band-pass filtering (Step S102), image thresholding (image binarization) (Step S103), and outline connection (Step S104). In the image thresholding, an image is segmented into a high density region having density higher than a predetermined density threshold value and a low density region having density lower than the threshold value. Further, to each of the high density region and the low density region, given is single density (for example, black and white). By binarizing the image, the outline is represented as a closed curve with high density, which is surrounded by a background region with low density.

A closed region surrounded by the outline extracted thus corresponds to an inside of the cell. By filling the closed region in a binary image (Step S105), the region of the cell is extracted as a solid graphics object with high density. The image can include objects corresponding to the small cell, the debris, and the like, other than the cell to be detected. In order to erase these objects, an object having a parameter relating to morphological characteristics which satisfies a predetermined erase condition is erased.

Specifically, an object having a length or a region as the above-described parameter is smaller than a predetermined value is erased (Step S106). Herein, erasing of the object means changing of an object which is determined as a high density region by the image thresholding to a low density region. Further, when it is known in advance that the shape of the cell is near a circle, for example, an object whose circularity is lower than a predetermined value or whose degree of flatness is higher than a predetermined value may be determined as one to be erased.

Next, a neck dividing process is performed (Step S107). Though described in detail later, when the object extracted as described above is formed of a plurality of cells that are connected to each other, this processing is performed to separate these connected cells. Such connection can occur in either of the cases where a plurality of cells are actually in contact with each other in the sample and where a plurality of cells are separated from each other in the sample but appear overlapping each other from an imaging direction. With the neck dividing process, the cells connected thus in the image can be separated from each other. By performing the neck dividing process, it becomes possible to reduce the error in the calculation of the number of cells in the image, the size of each cell, the area thereof, and the like.

In a case where the purpose is to quantitatively evaluate the number of cells, the size of each cell, and the like, it is possible to calculate these values on the basis of the result image obtained by these image processings performed so far, i.e., the binary image in which the region occupied by the cells and the other region are distinguished from each other. Operations in Step S108 and the following steps are needed to display the result obtained by the image processing in such a manner as to make the result visible to the user.

In Step S108, an image mask used to act on the original image is generated on the basis of the image after the processing. Specifically, such an image mask as to not shield the high density region and to shield the low density region in the image after the neck dividing process is generated. By causing the image mask to act on the original image, an output image for display is generated (Step S109). The output image generated thus is an image in which only the objects which are determined as the cells among the objects in the original image are extracted and the other objects are erased.

Note that the output image is not limited to the image after being subjected to the above-described masking process. For example, an image whose visibility of the region of the cell is increased by performing any of various processings such as coloring of the object region, enhancement of the outline, and the like, for the object which is determined as the cell among the objects in the original image can be obtained as the output image.

The output image generated thus is, for example, displayed on a display part, printed, or sent to an external device (Step S110), and the result of the image processing can be presented to the user.

Figure 2:
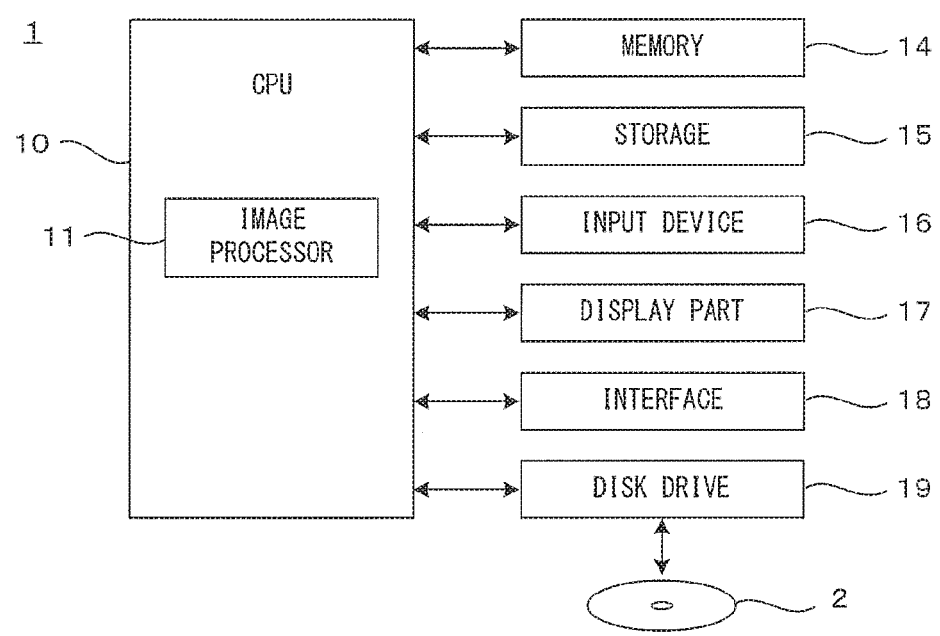
FIG. 2 is a diagram showing an exemplary configuration of a computer device which performs the image processing of the present embodiment.

FIG. 2 is a diagram showing an exemplary configuration of a computer device which performs the image processing of the present embodiment. The computer device 1 has, for example, a general configuration as a personal computer, and includes a CPU (Central Processing Unit) 10, a memory 14, a storage 15, an input device 16, a display part 17, an interface 18, a disk drive 19, and the like.

The CPU 10 executes a control program prepared in advance. Thereby an image processing part 11 as a function block for performing the above-described image processing is implemented by software. Note that dedicated hardware for implementing the image processing part 11 may be provided. The memory 14 temporarily stores therein various data generated during the operation performed by the CPU 10. The storage 15 stores therein the control program to be executed by the CPU 10 and image data of the original image, processed image data, and the like in the long term.

The input device 16 serves to receive an instruction input from an operator, and includes, for example, a mouse, a keyboard, or the like. Further, the display part 17 is, for example, a liquid crystal display having a function of displaying an image. The display part 17 displays thereon the original image, the processed image, and various information such as a message to the operator and the like. Note that, a touch panel in which the input device and the display part are unified may be provided.

The interface 18 exchanges various data with an external device via a telecommunications line. The disk drive 19 takes in an external recording disk 2 which records therein various data such as the image data, the control program, and the like. The image data, the control program, or the like stored in the recording disk 2 is read by the disk drive 19 and stored into the storage 15. The disk drive 19 may have a function of writing data generated inside the computer device 1 into the recording disk 2.

The control program which causes the computer device 1 to perform the image processing of the present embodiment may be read out when the disk drive 19 makes access to the recording disk 2 which non-transitorily records thereon the control program. Alternatively, the control program may be given from the external device via the interface 18. The same applies to the original image data.

Figure 3:
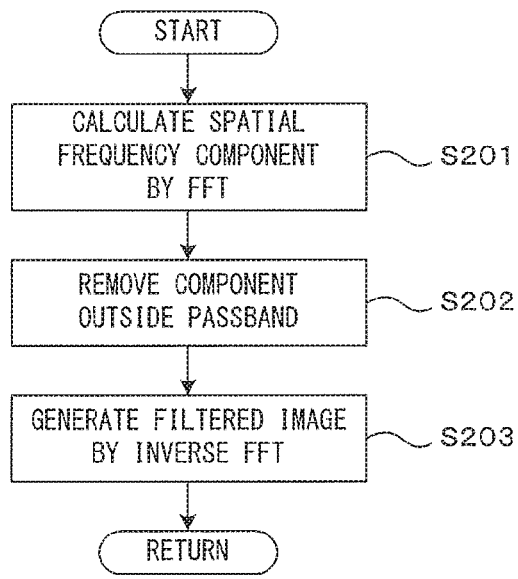
FIG. 3 is a flowchart showing the band-pass filtering process.
Figure 4:
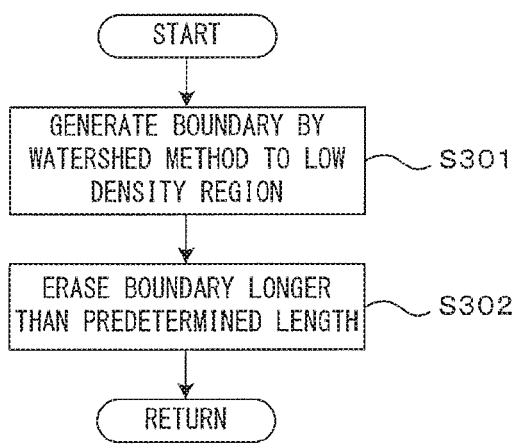
FIG. 4 is a flowchart showing the outline connecting process.

Hereinafter, with reference to FIGS. 3 to 8B, process steps of the above-described image processing will be described in detail, taking examples of changes in an image with the progress of the processings. FIG. 3 is a flowchart showing the band-pass filtering process, and FIG. 4 is a flowchart showing the outline connecting process. Further, FIGS. 5 to 7 and 8A and 8B are views schematically showing the examples of changes in the image with the progress of the processings. In the illustrations of FIGS. 5 to 8B, it is assumed that the cells detected from the image are regarded as a cell cluster called a "sphere" formed of a plurality of cells that aggregate into an almost spherical shape.

In the band-pass filtering (Step S102 in FIG. 1) of the present embodiment, as shown in FIG. 3, by performing an FFT (Fast Fourier Transform) operation on the original image data, the original image is broken down into spatial frequency components (Step S201). Then the spatial frequency components outside a passband on a frequency domain is removed (Step S202), and the image is reconstructed by performing an inverse transform operation of the Fourier transform (inverse FFT) (Step S203). By performing the band-pass filtering, both the change in the density of a relatively low frequency component, such as the density irregularity of the background, and the change in the density of a relatively high frequency component, such as the debris or an image noise can be attenuated.

The filtering can be achieved even by computation of pixel values among pixels like, for example, a smoothing process. By performing the filtering thus on the frequency domain through the FFT operation, however, it is possible to selectively take out the spatial frequency component of a limited band and largely attenuate the other band components.

This band-pass process is performed to extract the object corresponding to the outline of the cell from the image. Therefore, the passband is determined on the basis of the width of the outline that the cell can take. Specifically, when it is known in advance that the outline of the cell to be detected has the width that generally corresponds to about four to sixteen pixels, for example, a range of the spatial frequency component that corresponds to the size for eight to thirty-two pixels (in other words, the half wave length is almost the same as a range of the outline width) is selected as the passband. It is thereby possible to perform outline extraction specialized to the outline portion of the cell.

Figure 5:
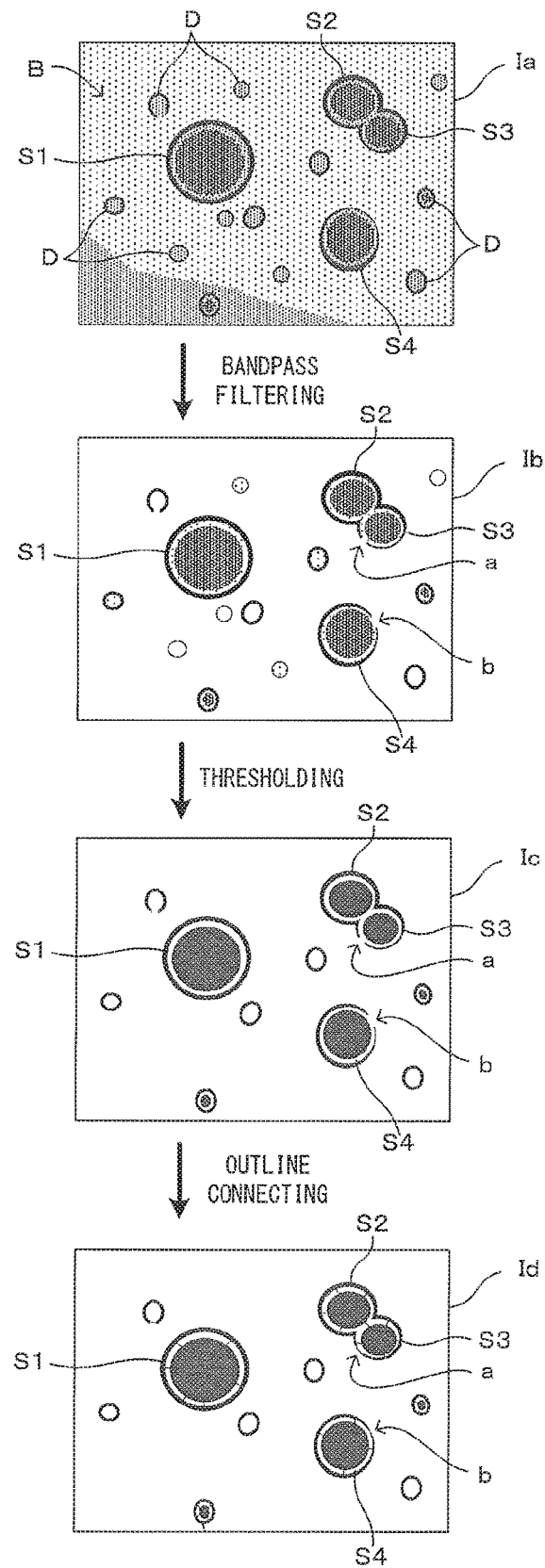
FIGS. 5 to 7, 8A and 8B are views schematically showing the examples of changes in the image with the progress of the processings.

An image Ia shown in FIG. 5 schematically shows an example of the original image acquired in Step S101. In the original image Ia, there is a state where spheres S1 to S4 to be detected and small cells, floating bodies, and the like which are not to be detected (hereinafter, generally referred to as "debris" and represented by reference sign D) are distributed in a substantially uniform background B. The spheres S1 to S4 each have an outer shape of almost circle or elliptical shape and each have an outline having an almost constant width and high density in its peripheral portion. Among these spheres, the spheres S2 and S3 are in contact with each other in the image. Though it is shown in this figure that the inside of each of the spheres S1 to S4 also has relatively high density, the texture inside the sphere may be any type. Further, there occurs density irregularity with high background density in the lower left portion of the original image Ia.

An image Ib schematically shows an example of the image after performing the band-pass filtering (BPF) process on the original image Ia. By the band-pass filtering in which optimization in accordance with the outline width of each of the spheres S1 to S4 is performed and both a low-frequency component and a high-frequency component not corresponding to the outline width are attenuated, the respective outlines of the spheres S1 to S4 remain almost without any change. On the other hand, though the density irregularity in the background B with low frequency and the components for the small cells each having a small outline width are largely reduced, the component that correspond to the pass-band in the band-pass filtering is maintained. For example, the outline of the small cell having almost the same width as that of the outline of the sphere is left in the image.

Further, in a case where there is a variation in the outline width among the spheres and the width does not correspond to the passband, the outline sometimes becomes thinner than that in the original image by the filtering. For this reason, as shown with reference signs a and b, for example, in a portion where the width of the outline of the sphere is partially small in the original image Ia, there can be some cases where part of the outline is lacked by attenuating the spatial frequency component in the filtering. Such a lack is compensated by the outline connecting process described later.

The image Ib after the filtering is binarized on the basis of an appropriate threshold value (Step S103). An image Ic shown in FIG. 5 schematically shows an example of the binarized image. By the image thresholding (binarization), the image is segmented into region with relatively high density and another region with low density. As shown in the image Ic of FIG. 5, the respective outlines and center portions of the spheres S1 to S4, the respective outlines of the small cells that remain relatively clear, and the like are distinguished into the high density region represented in black in this figure. On the other hand, the other regions are distinguished into the low density region represented in white in this figure and thereby virtually erased from the image. The threshold value for the image thresholding (binarization) can be determined by using a well-known method. For example, the threshold value determined in advance by a pre-experiment may be used, or may be dynamically determined by using a well-known threshold value determination method such as Otsu's method or the like.

Note that the above-described lack in the outline can occur in the course of the image thresholding. In order to compensate the lack in the outline, the outline connecting process (Step S104) is performed. An image Id shown in FIG. 5 schematically shows an example of the result image in the case of performing the process shown in FIG. 4 as the outline connecting process.

As shown in FIG. 4, in the outline connecting process, a dividing process known as the watershed method is performed on the low density region in the image Ic after the image thresholding. With this operation, a boundary line for dividing a continuous low density region into a plurality of regions is generated (Step S301). Then, among the boundary lines generated thus, a boundary line having a length not shorter than a predetermined length is erased (Step S302). The lack portion of the outline is thereby recovered.

Figure 6:
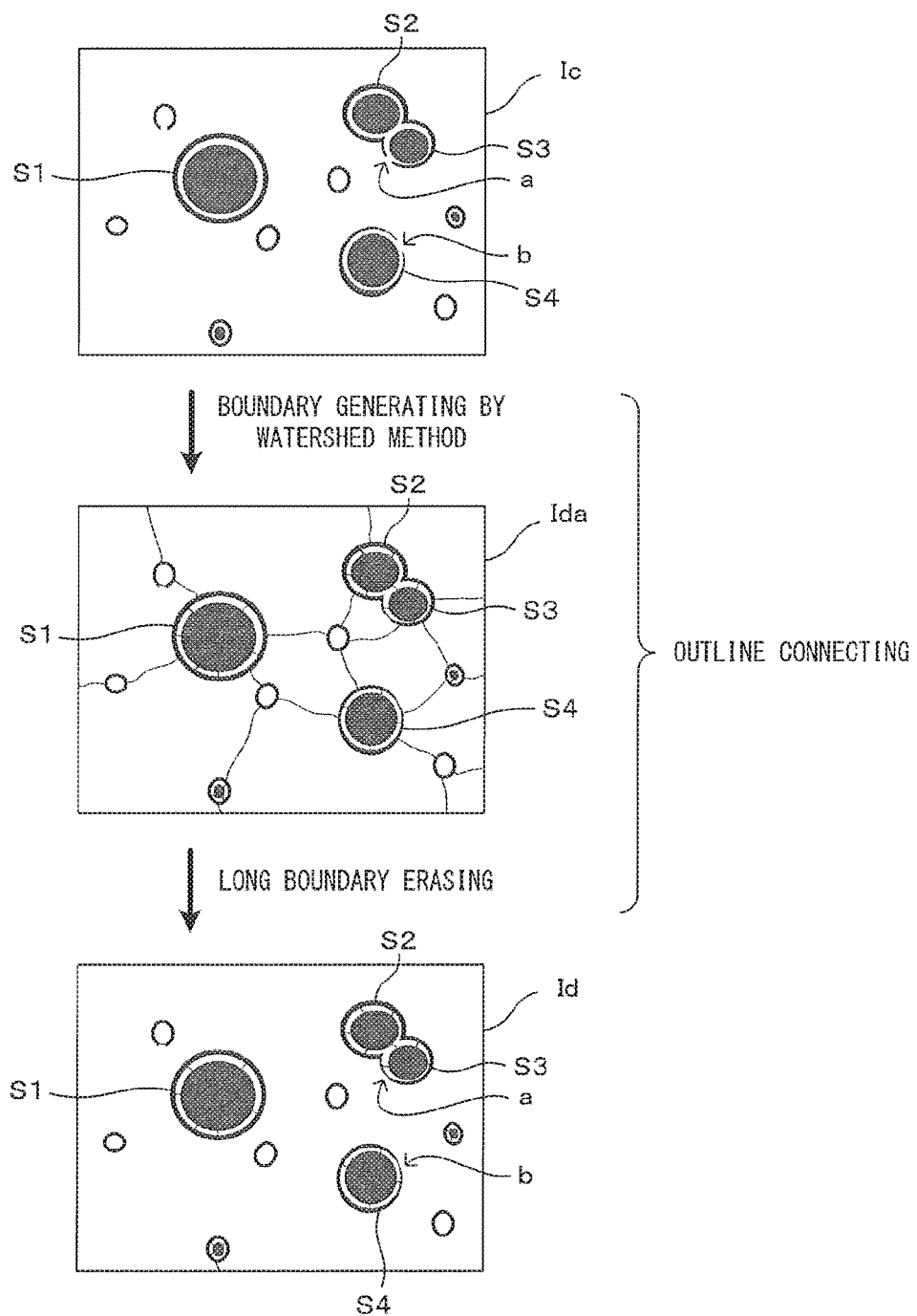

FIG. 6 schematically shows an example of changes in an image in the course of the outline connecting process. The dividing process using the watershed method (Step S301) is performed on the low density region in the image Ic after the image thresholding. Then, as shown in an image Ida, the boundary line is generated in a relatively narrow portion among the low density regions, which is sandwiched by the high density regions or the ends of the image. As shown with reference signs a and b, the boundary line is generated also in a portion at which the high density regions are adjacently opposed to each other, due to the partial lack in the outline. The outline that was open due to the lack is thereby closed again. In other words, the lack portion of the outline is compensated by the generated boundary line.

As shown in the image Ida, the boundary lines are disadvantageously generated in many portions, not only in the lacked outline portion, by the processings so far. In order to solve this problem, among the generated boundary lines, the boundary line having a length not shorter than the predetermined length is erased (Step S302). With this operation, as shown in the image Id of FIG. 6, a long boundary line generated in the low density region that is the background of the cells is erased while a short boundary line for compensating the lack of the outline is maintained. Thus, the lacked outline is compensated.

In Step S301, the boundary lines are generated also inside the objects of the sphere, the small cell, and the like and between adjacent objects. Such a short boundary line is sometimes left, not being erased even by executing Step S302. As described later, this is not a serious problem as long as the purpose is to extract the region of the cell from the image.

Further, as a method for compensating the lack of the outline, methods other than the above can be also used. For example, the partially lacked outline can be compensated also by combination of a dilation process in which the high density region is uniformly expanded by a predetermined number of pixels and an erosion process in which the expanded high density region is contracted by the same number of pixels. In such a dilation/erosion process, however, it is necessary to increase the number of pixels to be expanded in order to compensate even a relatively large lack. Then, there is a higher possibility that the objects which are positioned adjacently but actually separated from each other are disadvantageously connected. In the outline connecting process using the above-described watershed method, such a problem is hard to occur since no change is given to the high density region.

Figure 7:
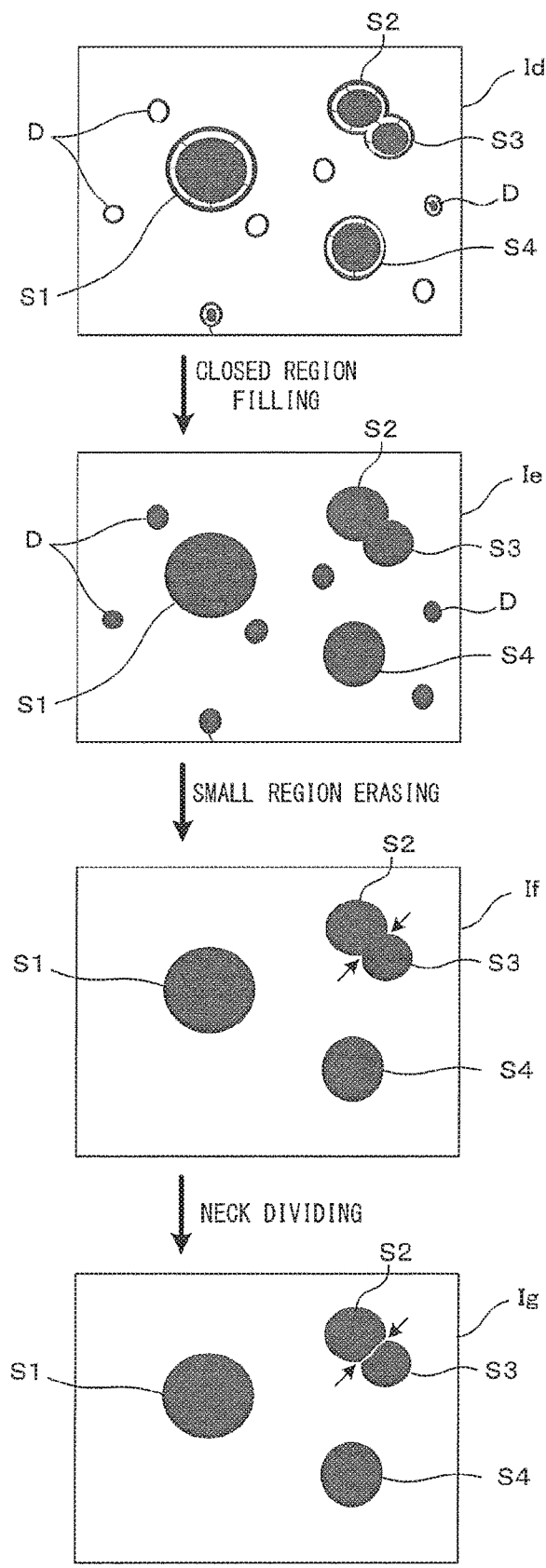

FIG. 7 schematically shows an example of changes in an image in the outline connecting process and the following processes. In the image Id after the outline connecting process, the closed region inside the closed curve of the high density region is filled with high density (Step S105). An image Ie schematically shows an example of the image after the filling. Thus, the low density region inside a region surrounded by the closed outline is converted into the high density region and the entire region becomes the high density region.

In the case where part of the outline is lacked, an open region escapes from being filled. It is possible, however, to suppress such escape from being filled, to the minimum. The reason is that the outline connecting process is performed in advance and the boundary line is thereby generated also inside the object. Further, since the boundary line generated inside the object is also filled in this stage, no ill effect is produced on the result.

Subsequently, erasing the small region is performed on the image Ie after the filling (Step S106). An image If is an exemplary image after erasing the small region from the image Ie. The region satisfying the predetermined erase condition, for example, where the length or the region is smaller than a predetermined value, the circularity does not satisfy a predetermined value, or the like is erased from the image Ie. The objects other than the spheres S1 to S4 to be detected are thereby erased.

Next, the neck dividing process is performed on the image If after erasing the small regions (Step S107). The neck dividing process is a dividing process for the high density region, and can use, for example, the watershed method. Among the objects included in the image If, the boundary line is set for a neck portion, for example, as indicated by the arrows. As a result, as shown in an image Ig, the boundary line is formed between the spheres S2 and S3 that are in contact with each other in the original image Ia, and these spheres are separated from each other in the image Ig.

Further, even if an originally unnecessary boundary line is generated between the objects in the outline connecting process, since this boundary line can be separated by the neck dividing process, the unnecessary boundary line does not become a cause of wrong detection.

By using the image Ig generated thus, it is possible to quantitatively obtain the number of spheres in the image, the diameter of each sphere, the area thereof, and the like. The objects other than those to be detected were erased and the spheres that are in contact with each other were separated. For this reason, it is possible to reduce the error in the measurement of the number of objects and the area of each object.

Figure 8A:
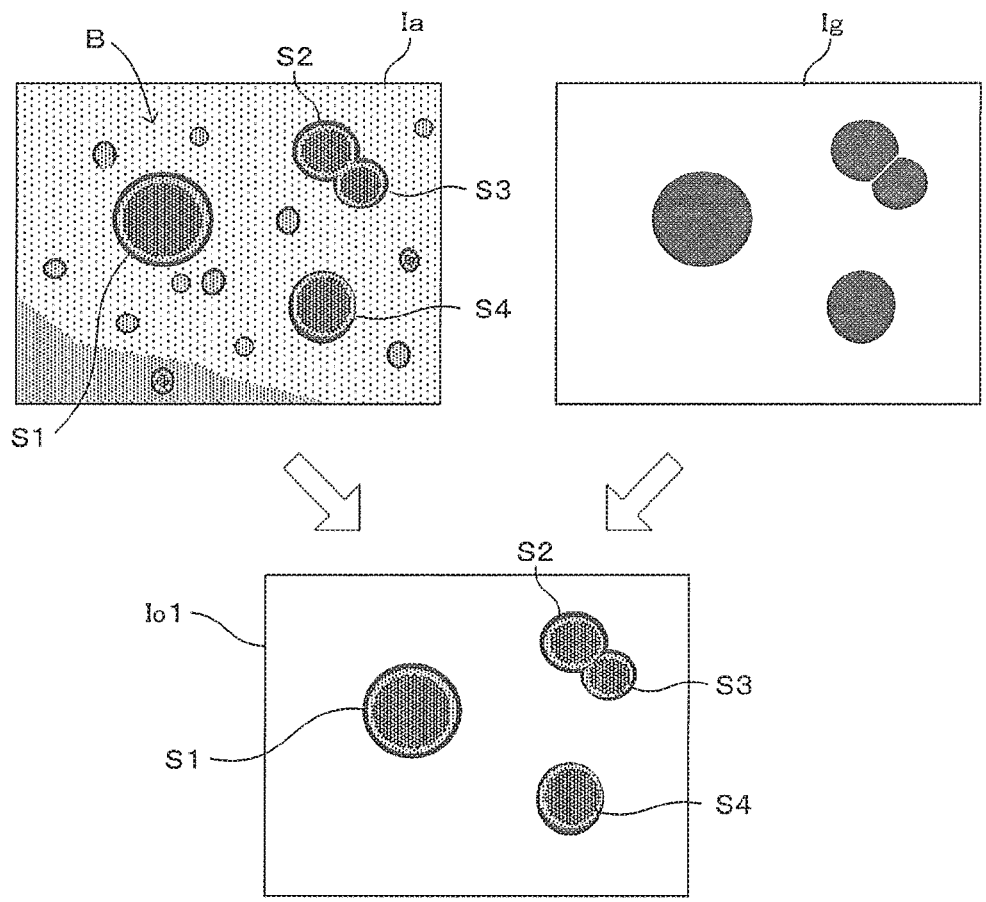
Figure 8B:
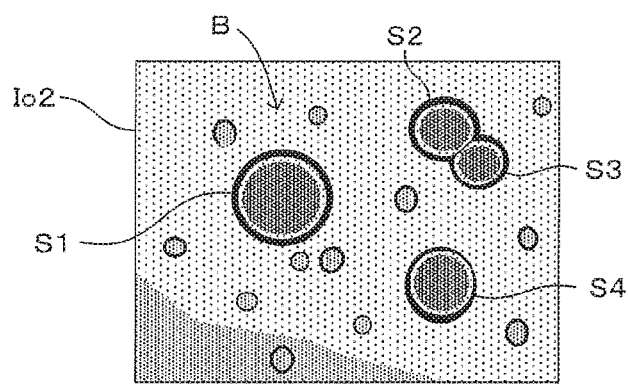

FIGS. 8A and 8B illustrate the process for generating the output image for display on the basis of the image Ig. As shown in FIG. 8A, by extracting only the regions of the spheres S1 to S4 from the original image Ia with the image Ig used as the image mask, the output image Io1 can be generated. Specifically, in the original image Ia, the regions corresponding to the high density regions in the image Ig are not masked while the regions corresponding to the low density regions are masked. It is thereby possible to obtain the output image Io1 in which the content of the original image Ia is maintained in the regions of the spheres S1 to S4 in the original image Ia and the objects in the other regions are erased.

By displaying such an image Io1, for example, on the display part 17, the user can easily observe in detail the respective shapes, internal structures, and the like of the spheres S1 to S4 included in the original image Ia.

Further, as shown in an image Io2 of FIG. 8B, by enhancing the respective outlines of the spheres S1 to S4 with the outline portions of the high density regions in the image Ig superimposed on the original image Ia or performing coloring of the regions in the original image Ia, corresponding to the high density regions in the image Ig, it is possible to increase the visibility of the spheres S1 to S4 detected in the original image Ia. Thus, the result of the image processing of the present embodiment can be used for the quantitative evaluation of the detection target, and can be also used for the purpose of effectively supporting the observation and evaluation of the image by the user.

In the image processing of the above-described embodiment, as shown in FIG. 1, the outline connecting process, the closed region filling process, the small region erasing process, and the neck dividing process are performed in this order. The order of execution of these processes can be partially changed as described below.

Figure 9:
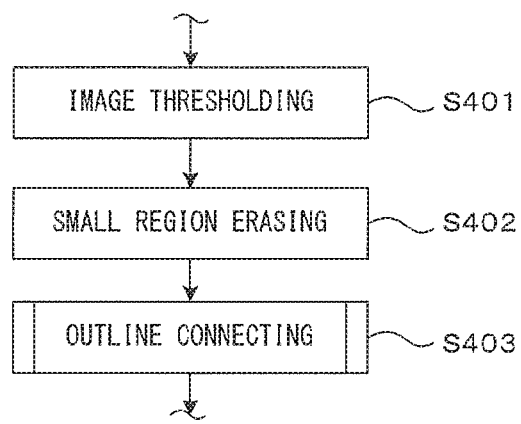
FIG. 9 is a flowchart showing a variation of the image processing flow.
Figure 10:
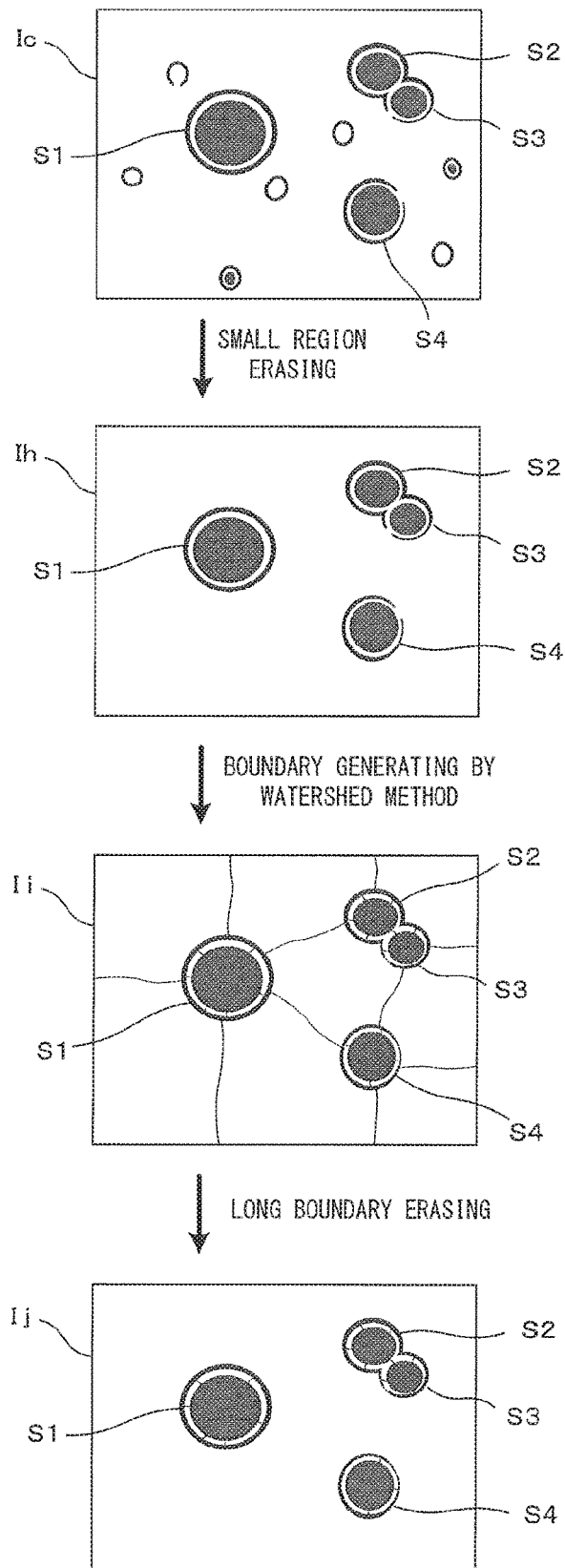
FIG. 10 is a view schematically showing an example of changes in the image in this variation.

FIG. 9 is a flowchart showing a variation of the image processing flow. Further, FIG. 10 is a view schematically showing an example of changes in the image in this variation. Since the contents of the image processing in the process steps of FIG. 9 are the same as those described above, detailed description thereof will be omitted.

In this variation, first, the small region erasing process is performed (Step S402) on the image Ic after the image thresholding (Step S401). An image Ih of FIG. 10 is an exemplary image in this stage. In the image Ih, the small objects corresponding to the small cells, the debris, and the like included in the image Ic are erased and only the objects corresponding to the spheres S1 to S4 remain. In the image Ih, the lack in the outline of the sphere, which is caused by the image thresholding, remains.

In order to compensate this lack, the outline connecting process is performed on the image Ih (Step S403). As shown in FIG. 4, the outline connecting process includes the dividing process using the watershed method on the low density regions and the process for erasing the boundary line having a length not shorter than the predetermined length. An image Ii is an exemplary image after the dividing process using the watershed method. The boundary line generated by the dividing compensates the lacked outline of the object and also connects the insides of the objects, the interval between the objects, the interval between the object and the end of the image, and the like.

After erasing the boundary line having a length not shorter than the predetermined length in the image Ii, as shown in an image Ij, only the short boundary lines such as the boundary line for compensating the lack in the outline of the object and the boundary line formed inside the object remain. In comparison between the image Ij and the image Id after the outline connecting process in the previous embodiment, there is a difference in that the objects of the small cells and the like included in the image Id are always erased in the image Ij. However, when the process for filling the closed region in the image Ij is performed, the result image is the same as the image If in the above-described embodiment. Thus, even if the order of execution of some processes is changed, the same result can be obtained.

As described above, the high density region of the above-described embodiment corresponds to the "first region" of the present invention and the low density region corresponds to the "second region" of the present invention.

Note that the present invention is not limited to the above-described embodiment, and various modifications of the invention other than those described above are possible without departing from the scope of the invention. For example, in the above-described embodiment, the relatively small object is determined not to be processed and the process for erasing the small region from the image is performed. By omitting this process, however, it becomes possible to determine all the objects in the image, to be processed. Furthermore, for this purpose, a plurality of passbands may be set in the band-pass filtering process.

Further, in the above-described embodiment, the watershed method is used in both the outline connecting process and the neck dividing process. Any other dividing method, however, can be used. Furthermore, the outline connecting process and the neck dividing process may be performed on the basis of different principles.

Further, as the band-pass filtering, not only the filtering on the above-described frequency domain but also more general computation among the pixels may be used. In this case, however, sharp cut-off characteristics are required.

Further, though the high density region in the original image is represented in black and the low density region therein is represented in white in the image after the image thresholding in the above-described embodiment, these representations may be reversed.

Furthermore, the result of the image processing is presented to the user by displaying the result in the above-described embodiment. However, the use of the result of extracting the region of the cell is not limited to the above-described case but any use may be freely adopted.

Further, though the extraction target is a three-dimensional cell-based structure called a sphere formed of a plurality of cells that aggregate in a substantially spherical shape in the above-described embodiment, the extraction target is not limited to this. The above-described processing can be also applied to, for example, extraction of cells that are independent of each other, a cell colony that two-dimensionally spreads in the culture medium, or the like.

Furthermore, in the above-described embodiment, the general-purpose computer device 1 performs the dividing process. As described earlier, however, this processing function may be incorporated, for example, in the imaging apparatus. Further, by additionally implementing a program to perform the dividing process of the present embodiment in the already-existing imaging apparatus, functionality expansion can be also achieved.

Thus, as has been described with the specific embodiment illustrated, in the present invention, there may be a case where the Fast Fourier Transform (FFT) is performed on the original image and the band-pass filtering is performed on a frequency domain. Such a filtering process is more suitable to selectively extract the spatial frequency component in a narrowband, as compared with the filtering process through computation among the pixels. For this reason, it is possible to extract the region having a size corresponding to the width of the outline of the cell, as clearly distinguished from the other region.

Further, for connection of the first regions, the dividing process using the watershed method on the second region can be used. In such a configuration, it is possible to appropriately separate the second region that should be originally separated by the continuous outline but is continuous due to the lack in the outline. This makes it possible to compensate the lacked outline.

On the other hand, for division of the neck, the dividing process using the watershed method on the first region can be used. In such a configuration, it is possible to appropriately divide the connection of the first regions due to the overlap of the cells, at the neck position, and separate the cells.

Further, the image processing method of the present invention may be configured to output an image obtained by performing processing for indicating a region corresponding to the first region after the dividing. In such a configuration, it is possible to explicitly present the region of the cell extracted from the original image to the user. It is thereby possible to effectively support the observation of the user.

Furthermore, the step of changing the first region satisfying the predetermined erase condition to the second region may be provided after the segmenting step and before the dividing step. In such a configuration, by removing the object not to be processed, which is included in the image, it is possible to simplify the processing and reduce wrong extraction in the later steps.

Further, the original image may be an image obtained by bright field imaging of the cell. In general, since the cells are almost transparent and the difference in the refractive index between the cells and the culture medium in which the cells are cultured is small, it is hard to distinguish between the cells and the other region by visual check in the bright field image. By applying the present invention to such an image, it becomes possible to favorably and stably extract the regions of the cells in the image. Furthermore, since the image obtained by bright field imaging without any labeling such as coloring or the like can be used, it becomes possible to noninvasively observe and evaluate the cell.

The present invention can be applied to fields such as biochemistry and medical care where cells are imaged and the image is evaluated, and especially is suitable for technical fields where the imaging without any processing that gives some damages to the cells being cultured is needed.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image processing method, comprising:
    acquiring an original image which includes a cell or a three-dimensional cell-based structure formed of a plurality of cells that aggregate as an imaging target;
    performing band-pass filtering on the original image with respect to a spatial frequency component within a band which is determined in accordance with a width of an outline of the imaging target to attenuate relatively other spatial frequency component outside the band;
    segmenting an image after the filtering into a first region which is a region having density higher than a predetermined threshold value and a second region which is a region other than the first region;
    connecting a plurality of the first regions that sandwich the second region by changing a portion of the second region which is sandwiched by the first regions to the first region in an image after the segmenting;

converting a closed region which is the second region in an image after the connection surrounded by the first region into the first region; and dividing the first region having a neck into a plurality of regions at a position of the neck in an image after the converting.

2. The image processing method according to claim 1, wherein a Fast Fourier Transform is performed on the original image and the band-pass filtering is performed on a frequency domain.

3. The image processing method according to claim 1, wherein in the connecting step, a dividing process using a watershed method on the second region is used.

4. The image processing method according to claim 1, wherein in dividing step, a dividing process using a watershed method on the first region is used.

5. The image processing method according to claim 1, further comprising outputting an image obtained by performing an image processing for indicating a region corresponding to the first region after the dividing.

6. The image processing method according to claim 1, further comprising changing the first region satisfying a predetermined erase condition to the second region after the segmenting step and before the dividing step.

7. The image processing method according to claim 1, wherein the original image is an image obtained by bright field imaging of the cells or the three-dimensional cell-based structure.

8. A non-transitory computer readable recording medium having stored thereon a computer program configured to cause a computer to carry out the steps of claim 1.

* * * * *